United States Patent
Abid et al.

(10) Patent No.: US 7,194,722 B1
(45) Date of Patent: *Mar. 20, 2007

(54) COST-INDEPENDENT CRITICALLY-BASED TARGET LOCATION SELECTION FOR COMBINATORIAL OPTIMIZATION

(75) Inventors: Salim Abid, Lafayette, CO (US); Victor Z. Slonim, Broomfield, CO (US)

(73) Assignee: Xilinx, Inc., San Jose, CA (US)

( * ) Notice: Subject to any disclaimer, the term of this patent is extended or adjusted under 35 U.S.C. 154(b) by 174 days.

This patent is subject to a terminal disclaimer.

(21) Appl. No.: 11/009,260

(22) Filed: Dec. 9, 2004

(51) Int. Cl.
G06F 17/50 (2006.01)
(52) U.S. Cl. .............................. 716/16; 716/17; 716/18
(58) Field of Classification Search .................... 716/2, 716/16–18
See application file for complete search history.

(56) References Cited

U.S. PATENT DOCUMENTS 6,289,496 B1 * 9/2001 Anderson et al. ............. 716/16
6,779,169 B1 * 8/2004 Singh et al. .................. 716/16
6,871,328 B1 * 3/2005 Fung et al. ..................... 716/1

OTHER PUBLICATIONS

U.S. Appl. No. 10/868,956, filed Jun. 15, 2004, Slonim et al.

Jimmy Lam et al.; "Performance of a New Annealing Schedule"; 25th ACM/IEEE Design Automation Conference; Copyright 1988 IEEE; Paper 22.1; pp. 306-311.

M. D. Huang et al.; "An Efficient General Cooling Schedule for Simulated Annealing"; Copyright 1986 IEEE; pp. 381384.

Juan De Vicente et al.; "FPGA Placement by Thermodynamic Combinatorial Optimization"; Proceedings of the 2002 Design, Automation and Test in Europe Conference and Exhibition (Date '02); Copyright 2002 IEEE; pp. 1-7.

Naveed Sherwani; "Algorithms for VLSI Physical Design Automation"; Third Edition; Published by Kluwer Academic Publishers; Copyright 1999; fourth printing 2002; pp. 226-229.

\* cited by examiner

*Primary Examiner*—Paul Dinh
(74) *Attorney, Agent, or Firm*—Kevin Cuenot

(57) ABSTRACT

A method of physical design for a programmable logic device can include associating target locations for movable objects with criticality measures and calculating the criticality measure for each target location. A probability for each target location can be calculated. The probability of the target location can be dependent upon the criticality measure for that target location. The method further can include selecting a target location for one of the movable objects for controlled movement during a simulated annealing process. The target location can be selected according to the probability corresponding to each target location.

16 Claims, 1 Drawing Sheet

COST-INDEPENDENT CRITICALLY-BASED TARGET LOCATION SELECTION FOR COMBINATORIAL OPTIMIZATION

BACKGROUND

1. Field of the Invention

This invention relates to the field of programmable logic devices and, more particularly, to the use of simulated annealing to optimize such devices.

2. Description of the Related Art

Simulated annealing is an optimization technique frequently used in the physical design of programmable logic devices (PLD's). As simulated annealing can be used to solve combinatorial optimization problems, the technique is commonly used to perform tasks such as partitioning, floorplanning, and placement for PLD's, and particularly field programmable gate arrays (FPGA's).

The technique explores multi-dimensional solution spaces to find an optimal solution through random generation of new combinatorial configurations. To generate a new configuration, an old or previous configuration is shuffled at random. For example, the configuration can be shuffled by displacing an object to a random location, exchanging locations of two or more objects, or performing other adjustments to the design that can affect a cost function. The cost function serves as a means of evaluating the quality of the proposed solution or move in view of predetermined design constraints.

Each configuration, such as a proposed FPGA placement solution, can be accepted or rejected based upon an evaluation of the cost function. If a decrease in the cost function occurs, the new configuration is accepted. Otherwise, the new configuration can be accepted with a probability that depends upon "temperature".

As simulated annealing was inspired through an analogy with the cooling of metals, the iterative process is regulated by a cooling schedule that dictates temperature. The cooling schedule specifies an initial temperature, a final temperature, and a function for changing the temperature as the simulated annealing process continues. The decreasing temperature restricts the allowable moves in the annealing process as the temperature decreases. Accordingly, the exploration of different placement solutions is stressed at high temperatures, while the convergence to a particular solution is stressed at lower temperatures.

Though simulated annealing can provide high quality solutions for PLD designs, the process requires significant computational resources. To overcome this need, various techniques for reducing the amount of time and computing resources required have been proposed. These approaches have been classified into three general categories: controlled move generation strategies, parallel implementations of simulated annealing, and efficient annealing schedules.

With respect to move generation strategies, conventional simulated annealing techniques randomly shuffle the current placement configuration. Thus, during controlled move generation, each object has an equal likelihood of being selected for displacement. This probability can be expressed as: $Pr(i)=1/N$, where N is the total number of identical objects and $$\sum_{i=1}^{N} Pr(i) = 1.$$

The target location also is selected among all available locations with equal probability, at least within a range limited area. This probability can be expressed as: $Pr(g,i)=1/N(g)$, where $Pr(g,i)$ is the conditional probability of selecting a location i as a target and $N(g)$ is the total number of selectable locations for group g.

The order in which moves are performed during simulated annealing is significant. Existing configurations are modified to produce new configurations. If the cost function decreases, the new configuration is accepted. The acceptance of a new configuration is an irreversible event in that subsequent configurations are based upon the most recently accepted configuration. Because of this, simulated annealing is said to be path dependent, meaning that the generation of a new configuration is conditionally dependent on the sequence of previously generated configurations.

As can be seen from the above discussion, conventional implementations of simulated annealing do not allow particular objects or target locations to be favored over others. This prevents knowledge that is specific to the circuit design, such as timing constraints and criticality, from being used in the simulated annealing process. It may be the case, for example, that some target locations will likely reduce propagation delays or reduce path criticality more so than others. These target locations, however, are not favored over others during conventional simulated annealing. In consequence, computer resources can be squandered in testing object moves and/or target locations that are unlikely to change the cost function and result in circuit optimization.

It would be beneficial to provide a technique for simulated annealing that encourages selection of objects and/or target locations for controlled move generation with respect to design considerations.

SUMMARY OF THE INVENTION

The present invention provides a method, system, and apparatus relating to physical design for programmable logic devices (PLD's). One embodiment of the present invention can include a method of physical design for a PLD. The method can include (a) associating movable objects with target locations, (b) calculating a criticality measure for each of the above target locations, and (c) calculating a probability for each target location. The probability of a target location can be dependent upon the criticality measure for that target location. The method further can include (d) selecting a target location for one of the movable objects for controlled movement during a simulated annealing process according to the probability for each target location.

The method also can include performing a controlled movement of at least one of the movable objects to generate a new configuration of the PLD. Timing information for the new configuration of the PLD can be determined. Accordingly, steps (b), (c), and (d) can be performed or repeated using the timing information for the new configuration.

In one embodiment, the criticality measure is independent of a cost function used during the simulated annealing process. The criticality measure can be expressed as $Crit_{TLS}(g,i)=1+mult*F_{TLS}(g,i)$. The value assigned to mult can vary during the simulated annealing process. The probability distribution for selecting target locations can be expressed as a monotonically decreasing function of criticality. In one embodiment, the probability for a given target location can be expressed as $$Pr_{TLS}(g, i) = \frac{Crit_{TLS}(g, i)}{\sum_{i=1}^{N} Crit_{TLS}(g, i)}.$$

In another embodiment, $F_{TLS}(g,i)$ can be a superposition of multiple functions. As such, $F_{TLS}(g,i)$ can be expressed as $F_{TLS}(g,i)=F1(i)*F2(i)*F3(g,i)$. $F1(i)$ can be a static function that depends upon at least one of a hardware characteristic and/or a design constraint. The hardware characteristic or design constraint can include at least one of location type, internal location delay, number of routing resources adjacent to a location, or type of routing resources adjacent to a location.

$F2(i)$ can be a dynamic function that depends upon a current state of placement for the PLD at a given time during simulated annealing. This state of placement can include at least one characteristic selected from at least one of a current congestion map, a current density map, a number of empty slots around a given location i, and/or a type of moveable object.

$F3(g,i)$ can be a dynamic, local function that is dependent upon relative positions of a selected object to be moved and the target location to which the selected object is to be moved. The function $F3(g,i)$ can prioritize according to at least one of a straight path between the selected object to be moved and the target location, or prioritize critical path delay. In another embodiment, $F3(g,i)$ can be limited to being updated only for critical objects.

Other embodiments of the present invention can include a machine readable storage that has been programmed to cause a machine to perform the steps disclosed herein as well as a system having means for performing the various steps described herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
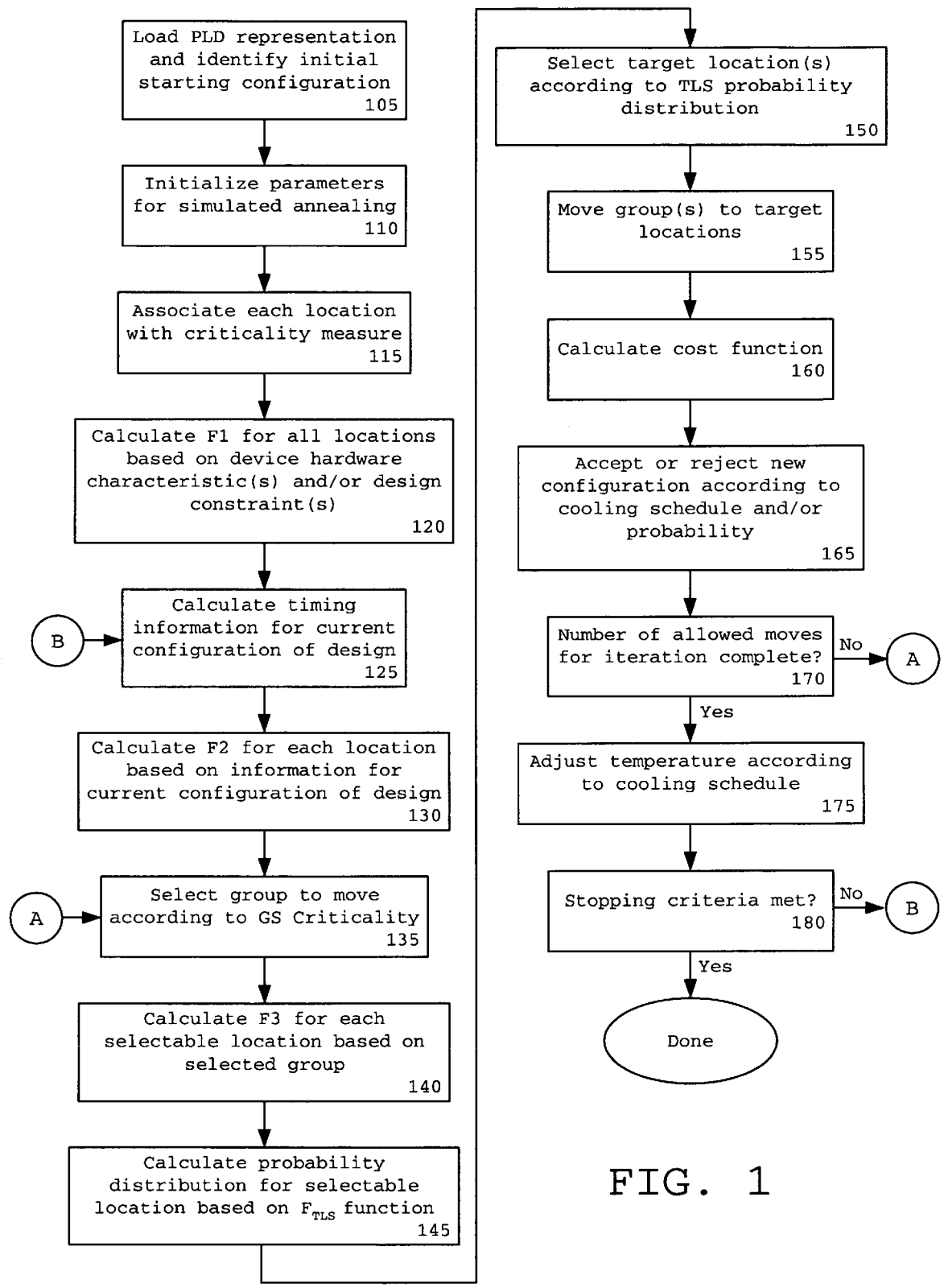
FIG. 1 is a flow chart illustrating a method of performing simulated annealing of a design for a programmable logic device in accordance with the inventive arrangements disclosed herein.

The present invention provides a method, system, and apparatus for performing simulated annealing of a design for a programmable logic device (PLD). In one embodiment of the present invention, a criticality measure is used, at least in part, to select target locations for controlled move generation during simulated annealing or another combinatorial-based design technique. The criticality measure can depend upon any of a variety of parameters including, but not limited to, the design of the physical device itself, the current placement of the PLD at a given point during simulated annealing, and/or the object and target location begin evaluated.

FIG. 1 is a flow chart illustrating a method 100 of performing simulated annealing of a design for a PLD in accordance with the inventive arrangements disclosed herein. The method 100 can be performed by a software-based PLD design tool operating within a suitable information processing or computer system. In one embodiment, the design tool can be configured to operate upon designs for FPGA devices.

The method 100 can begin in step 105 where a netlist or other circuit representation specifying PLD logic functions is loaded into the design tool. A starting configuration for the design can be determined, for example at random, to serve as a baseline for the simulated annealing process. In step 110, the parameters for simulated annealing can be initialized. These parameters can include, but are not limited to, those parameters specific to a cooling schedule such as an initial temperature and a final temperature. Any of a variety of known functions for regulating the cooling schedule can be used.

In step 115, each location within the PLD design to which an object can be moved is associated with a criticality measure. An object, or movable object, refers to the type of component or component grouping that is to be annealed. As noted, simulated annealing can be used to perform partitioning, floorplanning, and placement for PLD's. Accordingly, it should be appreciated that a movable object can include, but is not limited to, individual components or a group of more than one component such as a logic block and/or a module.

The criticality measure relating to target location selection (TLS) is a function denoted as $Crit_{TLS}(g,i)$, where g is the selected group, in this case an object, to be moved and i refers to the target location to which the group may be moved. The TLS criticality measure can incorporate many parameters including, but not limited to, hardware specific parameters of the design, design constraints, parameters relating to the current state of the PLD placement within the simulated annealing process, and relative positions between selected target locations and objects to be moved to such locations.

In one embodiment, the criticality measure can be expressed as $Crit_{TLS}(g,i)=1+mult*F_{TLS}(g,i)$. The function $F_{TLS}(g,i)$ is referred to as the total TLS criticality. The multiplier mult facilitates control over the degree of non-uniformity of the probability distribution. That is, if mult=0, then $Crit_{TLS}(g,i)=1$ and the probability distribution of the TLS criticality, given by $$Pr_{TLS}(g, i) = \frac{Crit_{TLS}(g, i)}{\sum_{i=1}^{N} Crit_{TLS}(g, i)},$$

is uniform similar to conventional simulated annealer formulation. If, however, mult is large, the probability distribution will be skewed. For target locations with large $F_{TLS}(g,i)$, $Pr_{TLS}(g,i)$ is close to 1, so that the target location will be selected most of the time.

In one embodiment, the TLS criticality can be a superposition of three different functions. As such, the total TLS criticality $F_{TLS}(g,i)$ can be expressed as $F_{TLS}(g,i)=F1(i)*F2(i)*F3(g,i)$. Each of the constituent functions forming $F_{TLS}(g,i)$ can model one or more distinct parameters relating to the PLD design.

$F1(i)$ can represent a static function that is determined, at least in part, by hardware characteristics and/or design constraints. Hardware characteristics can include, but are not limited to, location type indicating the functionality associated with a given target location such as I/O buffer, CPU, or the like, internal location delay referring to the delay within a given logic block type, and number and type of routing resources such as wires of varying kind that are adjacent to a given location. Design constraints can refer to required performance metrics which the PLD must meet once complete. Such constraints can include, for example, timing requirements of signal paths.

The function F2(i) can be a dynamic function that is determined, at least in part, according to a current state of the placement for the PLD. The current state of placement can be modeled using parameters selected from a congestion map of the current placement in reference to competition for wiring resources, a density map of the current placement, and the number of empty slots around or surrounding a given location i. F2(i) also can depend upon the object type being evaluated for a move. That is, the number of locations that are allowed to accept a given type of object being considered for a move can be determined.

The function F3(g,i) can be a dynamic, local function that depends upon relative positions of a selected group g and the target location indicated by i. The function F3(g,i) can be selected to favor, or prioritize, target locations that result in critical paths between two points that are straighter, or more direct, or that decrease any critical path delays. Critical paths are those paths of the PLD design that do not meet timing requirements specified for the design.

In step 120, the function F1(i) can be calculated for all locations i of the PLD. As noted, the function F1(i) accounts for hardware characteristics and design constraints. Notably, as the function F1(i) is static in nature, the function need only be calculated one time for each location i. This can be performed at the start of the simulated annealing process.

In step 125, timing information can be determined for the current state of placement for the design. That is, the design tool can perform an analysis upon the PLD design to determine the timing information such as the amount of time required for signals to propagate down or through connections and/or paths of the PLD. In the first iteration of the simulated annealing process, the timing analysis is performed upon the baseline or initial configuration of the design. This baseline configuration can be a random configuration. In step 130, the function F2(i) can be calculated for each target location using information obtained from the current placement.

In step 135, a group can be selected to be moved. In one embodiment, the group to be moved can be selected at random such that each group has an equal likelihood of being selected. In another embodiment, a group can be selected according to a group select (GS) criticality. The GS criticality can be a function expressed as $Crit_{GS}(i)$ that can utilize object type, group connectivity, group shape, number of elements in a group, other user constraints, as well as timing information as parameters. Timing information for the design can include, but is not limited to, the number of critical paths adjacent to a movable object, slack, and the like.

In step 140, the function F3(g,i) can be calculated. More particularly, once a group is selected for relocation, the locations to which the selected group can be moved can be evaluated. Accordingly, F3(g,i) can be calculated according to the selected group(s) and the TLS criticality can be updated. While the function F3(g,i) can be calculated for each attempted move on a frequent basis, in another embodiment, the calculation of function F3(g,i) can be limited to selected groups.

In illustration, the function F3(g,i) can be calculated only for critical groups. Notably, since F3(g,i) is multiplied with F1(i) and F2(i) in calculating $F_{TLS}(g,i)$, when F3(g,i) is not calculated for a non-critical group or object, the probability of selecting that group remains low. In contrast, by computing F3(g,i) for critical groups or objects, the probability of selecting a critical group is further increased as $F_{TLS}(g,i)$ is increased. This increases the likelihood that critical groups or objects will be selected or moved.

Still, other templates of selected groups can be defined for which the function F3(g,i) can be calculated using any parameters, or combinations thereof, noted herein. By limiting the number of groups for which function F3(g,i) is calculated, computational time can be saved. Thus, in such an embodiment, a determination as to whether function F3(g,i) should be calculated can be performed prior to calculating F3(g,i).

In step 145, a TLS probability distribution for selectable locations can be calculated. The TLS probability distribution can be expressed as $$Pr_{TLS}(g, i) = \frac{Crit_{TLS}(g, i)}{\sum_{i=1}^{N} Crit_{TLS}(g, i)}.$$

Notably, $Pr_{TLS}(g,i)$ can be classified as a monotonically decreasing function of criticality, where higher criticality corresponds to higher probability of selection. In step 150, one or more target locations can be selected based upon the TLS probability distribution. In step 155, the selected groups can be moved, or reassigned, to the target locations selected in step 150.

In step 160, a cost function can be calculated to evaluate the quality of the proposed move, or new design configuration. The new configuration, i.e. placement, is accepted if the cost function improves over the last iteration, or is accepted with a probability that is dependent upon the temperature in step 165.

In step 170, a determination can be made as to whether a predetermined number of iterations have been determined for the current phase of simulated annealing. If so, the method can proceed to step 175. If not, the method can loop back to step 135 to continue processing until the designated number of iterations has been reached.

In step 175, having performed the desired number of iterations, the temperature can be adjusted according to the cooling schedule. The temperature can be adjusted downwardly to simulate cooling, thereby restricting the number of moves, and thus configurations, that will be accepted. In step 180, a determination can be made as to whether one or more stopping criteria have been met. The stopping criteria can include the temperature dropping to a particular temperature or the cost function yielding a value that has improved by a particular percentage or that falls within a particular range. If one or more of the stopping criteria have not been met, the method can loop back to step 125 to repeat as necessary.

The inventive arrangements disclosed herein provide a solution for move-set design used in simulated annealing techniques. The inventive arrangements modify the probability of selecting target locations based upon a measure of criticality corresponding to each location. This facilitates the selection of target locations that are most likely to affect the design. The use of the criticality measures disclosed herein further is independent of the cost function used to control the simulated annealing process.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code, or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of physical design for a programmable logic device comprising:
    associating movable objects with target locations, wherein movable objects are components of a circuit design that are to be annealed and target locations are potential locations for receiving the movable objects;
    calculating a criticality measure for each of the target locations, wherein the criticality measure of a given target location depends, at least in part, upon a functionality associated with the target location;
    calculating a probability for each target location, wherein each probability is dependent upon the criticality measure for the associated target location; and
    selecting a target location for one of the movable objects for movement during a simulated annealing process according to the probability for each target location, wherein the simulated annealing process implements a circuit design for the programmable logic device.

2. The method of claim 1, further comprising:
    performing a movement of the at least one movable object to generate a new configuration of the programmable logic device;
    determining timing information for the new configuration of the programmable logic device; and
    performing at least the calculating the criticality measure step using the timing information for the new configuration.

3. The method of claim 1, wherein the criticality measure is independent of a cost function used during the simulated annealing process.

4. The method of claim 1, wherein a probability distribution for selecting target locations is expressed as a monotonically decreasing function of criticality.

5. The method of claim 1, wherein the criticality measure is expressed as $Crit_{TLS}(g,i)=1+mult*F_{TLS}(g,i)$, where g is a selected group of one or more movable objects to be moved and i refers to a target location to which the group may be moved, mult is a multiplier constant, and $F_{TLS}(g,i)$ depends, at least in part, up a location type indicating functionality of a given target location i.

6. The method of claim 5, where a value of mult varies during the simulated annealing process.

7. The method of claim 5, wherein the probability for a given target location is expressed as $$Pr_{TLS}(g, i) = \frac{Crit_{TLS}(g, i)}{\sum_{i=1}^{N} Crit_{TLS}(g, i)}.$$

8. The method of claim 5, wherein $F_{TLS}(g,i)$ is a superposition of multiple functions.

9. The method of claim 5, wherein $F_{TLS}(g,i)$ comprises a static function that depends upon at least one of a hardware characteristic and a design constraint, a dynamic function that depends upon a current state of placement for the programmable logic device at a given time during simulated annealing, and a dynamic, local function that is dependent upon relative positions of a selected object to be moved and the target location to which the selected object is to be moved.

10. The method of claim 9, wherein the hardware characteristic or design constraint includes at least one of location type, internal location delay, number of routing resources adjacent to a location, and type of routing resources adjacent to a location.

11. The method of claim 9, wherein the state of placement includes at least one characteristic selected from at least one of a current congestion map, a current density map, a number of empty slots around a given location i, and a type of moveable object.

12. The method of claim 9, wherein the dynamic, local function prioritizes according to at least one of a straight path between the selected object to be moved and the target location, and critical path delay.

13. The method of claim 12, wherein the dynamic, local function is updated only for critical objects.

14. A machine readable storage, having stored thereon a computer program having a plurality of code sections executable by a machine for causing the machine to perform the steps of:
    associating movable objects with target locations, wherein movable objects are components of a circuit design that are to be annealed and target locations are potential locations for receiving the movable objects;
    calculating a criticality measure for each of the target locations, wherein the criticality measure of a given target location depends, at least in part, upon a functionality associated with the target location;
    calculating a probability for each target location, wherein each probability is dependent upon a criticality measure for an associated target location; and
    selecting a target location for one of the movable objects for movement during a simulated annealing process according to computed probability distribution, wherein the simulated annealing process implements a circuit design for the programmable logic device.

15. The machine readable storage of claim 14, further comprising:

performing a movement of the at least one movable object to generate a new configuration of the programmable logic device;

determining timing information for the new configuration of the programmable logic device; and performing said steps of calculating a criticality measure, calculating a probability, and selecting a target location using the timing information for the new configuration.

16. A system for physical design of a programmable logic device comprising:

means for associating target locations for movable objects with criticality measures, wherein movable objects are components of a circuit design that are to be annealed and target locations are potential locations for receiving the movable objects;

means for calculating a criticality measure for each target location, wherein the criticality measure of a given target location depends, at least in part, upon a functionality associated with the target location;

means for calculating a probability for each target location, wherein each probability is dependent upon the criticality measure of the associated target location; and means for selecting a target location for one of the movable objects for movement during a simulated annealing process according to the probability for each target location, wherein the simulated annealing process implements a circuit design for the programmable logic device.

\* \* \* \* \*